United States Patent [19]

Jüptner et al.

[11] Patent Number: 4,772,772
[45] Date of Patent: Sep. 20, 1988

[54] PROCESS FOR THE SUPERVISION OF THE MACHINING PROCESS USING A HIGH-POWER ENERGY SOURCE, IN PARTICULAR A LASER, AND MACHINING OPTICAL SYSTEM FOR CARRYING OUT THE SAME

[75] Inventors: Werner Jüptner, Ritterhude; Rüdiger Rothe, Bremen; Gerd Sepold, Bad Zwischenahn, all of Fed. Rep. of Germany

[73] Assignee: Bias Forschungs Und Entwicklungslabor Fur Angewandte Strahtechnik GmbH, Fed. Rep. of Germany

[21] Appl. No.: 68,302

[22] Filed: Jul. 1, 1987

[30] Foreign Application Priority Data

Jul. 11, 1986 [DE] Fed. Rep. of Germany ....... 3623409

[51] Int. Cl.⁴ ............................................. B23K 26/02
[52] U.S. Cl. ......................... 219/121.83; 219/121.74; 219/121.67; 219/121.63
[58] Field of Search .................. 219/121 LQ, 121 LZ, 219/121 LU, 121 LA, 121 LB, 121 LC, 121 LD, 121 LG, 121 LN

[56] References Cited

U.S. PATENT DOCUMENTS

| 3,441,973 | 3/1976 | Luck, Jr. et al. | 216/121 LZ X |
| 4,648,400 | 3/1987 | Schneider et al. | 219/121 LQ X |
| 4,675,501 | 6/1987 | Klingel | 219/121 LZ X |

FOREIGN PATENT DOCUMENTS

| 140117 | 2/1980 | Fed. Rep. of Germany . | |
| 0006785 | 1/1983 | Japan | 219/121 LZ |
| 0205689 | 11/1983 | Japan | 219/121 LZ |
| 27793 | 2/1984 | Japan . | |
| 0102290 | 6/1985 | Japan | 219/121 LQ |

*Primary Examiner*—C. L. Albritton
*Attorney, Agent, or Firm*—Sughrue, Mion, Zinn, Macpeak, and Seas

[57] ABSTRACT

The machining results of high-power lasers with machining optical systems (25) for beam shaping are dependent on the fact that decisive machining parameters, namely the beam power, the beam diameter, the position of the beam relative to the optical axis (54) and the intensity of the radiation reflected back, are supervised. To this end, the invention proposes a process by which the essential beam parameters can be measured during machining directly at a machining optical system (25) designed in an appropriate manner according to the invention. To this end, the appropriate measurement value receivers are associated, according to the invention, with the deflecting mirror (26) and/or the focusing mirror (27) of the machining optical system (25).

32 Claims, 6 Drawing Sheets

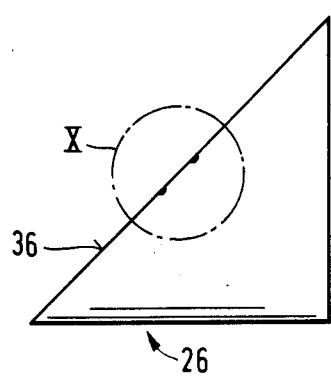
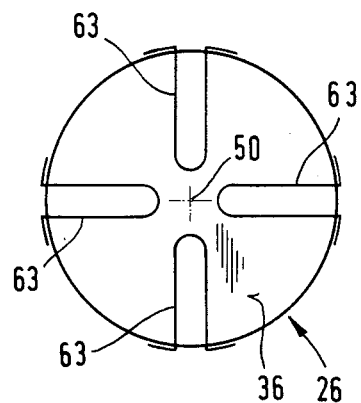
Fig. 8                Fig. 9
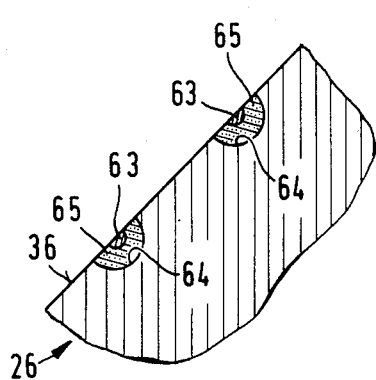
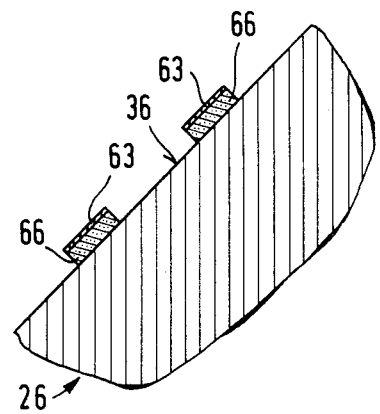
Fig. 10               Fig. 11

PROCESS FOR THE SUPERVISION OF THE MACHINING PROCESS USING A HIGH-POWER ENERGY SOURCE, IN PARTICULAR A LASER, AND MACHINING OPTICAL SYSTEM FOR CARRYING OUT THE SAME

BACKGROUND OF THE INVENTION

The invention relates to a process for the supervision of a machining process using a high-power energy source, in particular a laser, and to a machining optical system for carrying out the process.

High-power energy sources, in particular electron beams or focused laser beams ($CO_2$ laser) which are employed for the machining of materials, namely cutting, welding and surface finishing, have appropriate beam-guiding optical systems which are adapted to the respective machining function. In this connection, a matter of particular importance is the machining optical system of the laser, which optical system has a substantial influence on the quality of the machining operation to be carried out. In order to guarantee an optimal machining quality which is as uniform as possible during the entire machining operation, it is necessary to maintain the machining process at the workpiece constant.

To this end, the decisive beam parameters are the beam power, the beam diameter, the position of the beam and the radiation reflected back, which can be subject to temporal fluctuations during the machining operation and must therefore be taken into consideration.

SUMMARY OF THE INVENTION

The object of the invention is accordingly to provide a process and a machining optical system for the supervision of the machining process of a high-power laser ($CO_2$ laser), whereby the essential relevant parameters having an effect on the quality of the machining of the material may be determined.

As a result of the fact that the relevant parameters of the laser beam are measured during the machining of the material, the possibility of comprehensive integrated process supervision is created, specifically where it is possible for the measurement to be carried out not only completely but also most simply and most reliably, namely at the machining optical system. This also has advantages if the laser is to be employed for other machining operations, which require no machining optical system or another machining optical system, because in those circumstances it is specifically the case that the sensitive measuring instruments which are no longer necessary in such cases no longer need to remain unused on the device.

Expediently, the measurement of the quantities required for the power of the laser beam, the position of the same in relation to the optical axis, the diameter of the laser beam, the degree of contamination of the mirrors (deflecting mirror, focusing mirror) and the laser radiation reflected back takes place at the machining optical system by means of appropriately designed measurement value receivers or transducers. In a particularly preferred embodiment of the process according to the invention, the measurement of the relevant parameters mentioned above takes place cumulatively.

By means of appropriate transformation of the measurement results, it is possible to supply these directly to appropriate setting drives etc., which - in the event of deviations from the theoretical value - undertake appropriate corrections to the beam guidance of the laser. Further subclaims relate to the processes for the determination of the respective measurement values.

By means of the association of appropriate measurement transducers (detectors) with the deflecting mirror and the focusing mirror of the machining optical system, a pick-off of the parameters takes place directly where any possible deviations can arise and an effect on the same is possibly to be exerted. Over and above this, interfering measurement components in the machining optical system are avoided.

Further features of the invention relate to the constructional refinement of the measurement value receivers or transducers at the deflecting mirror and focusing mirror for the determination of the specific measurement values.

Preferred exemplary embodiments of the invention are explained in greater detail herein below, with reference to the drawings.

BRIEF DESCRIPTION OF THE DRAWINGS

FIG. 8 shows a deflecting mirror with sensors disposed on the mirror surface, FIG. 9 shows a plan view onto the mirror surface of the deflecting mirror according to FIG. 8, FIG. 10 shows a detail X, represented oon an enlarged scale, of the deflecting mirror according to FIG. 8 cut in the region of a sensor, and FIG. 11 shows an alternative embodiment for the arrangement of the sensors on the mirror surface of the deflecting mirror in a representation according to FIG. 10.

DETAILED DESCRIPTION OF PREFERRED EMBODIMENTS

Figure 1:
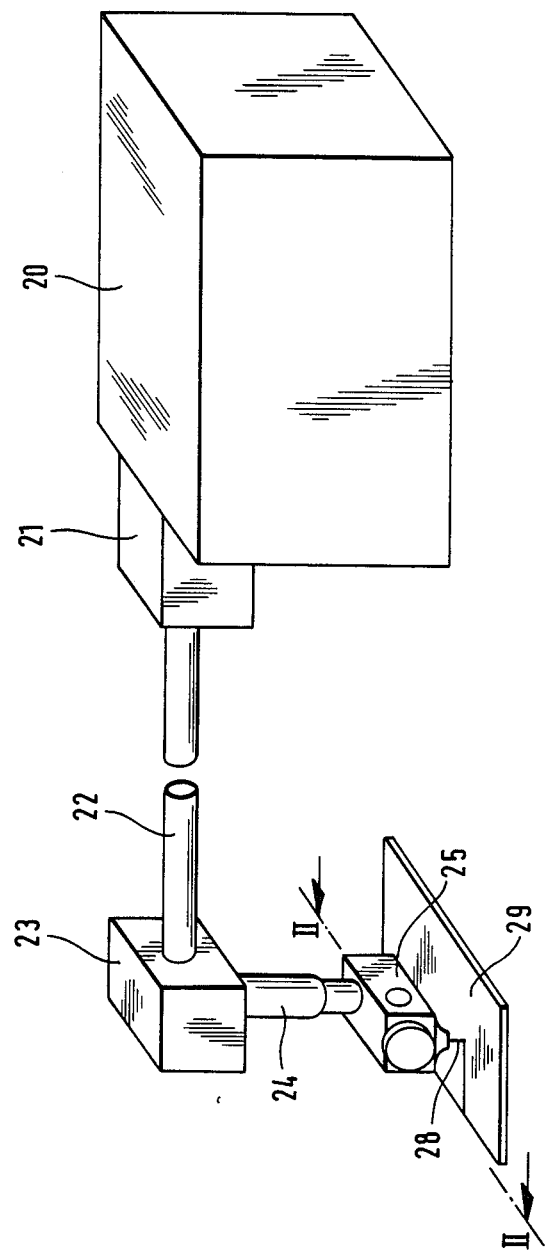
FIG. 1 shows the schematic construction of a laser machining device in perspective representation.

FIG. 1 shows, on an illustrative basis, the basic construction of a laser for carrying out the process according to the invention with the machining optical system according to the invention. The energy source which is employed in this case is a high-power laser, namely a $CO_2$ laser 20. A telescope 21 is situated at the beam output of the $CO_2$ laser 20. The telescope is connected to a beam-deflecting optical system 23 by means of a (horizontal) protecting tube 22. By means of the beam-deflecting optical system, the laser beam coming through the protecting tube 22 is deflected out of the horizontal into a vertical beam direction. From the beam-deflecting optical system 23, the laser beam finally passes through a further (vertical) protecting tube 24 to the machining optical system 25.

Figure 2:
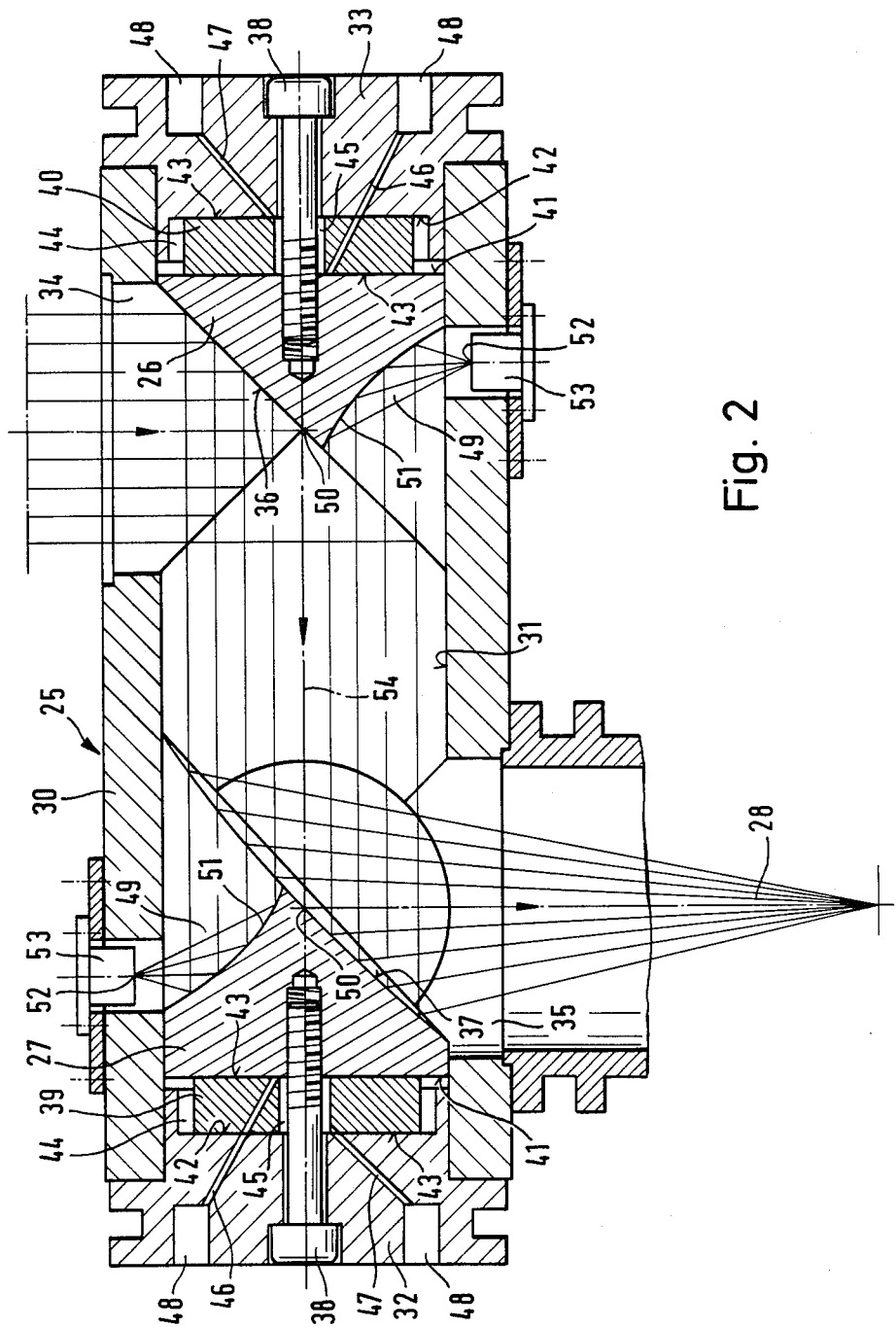
FIG. 2 shows a vertical longitudinal section through a machining optical system according to a first exemplary embodiment.
Figure 5:
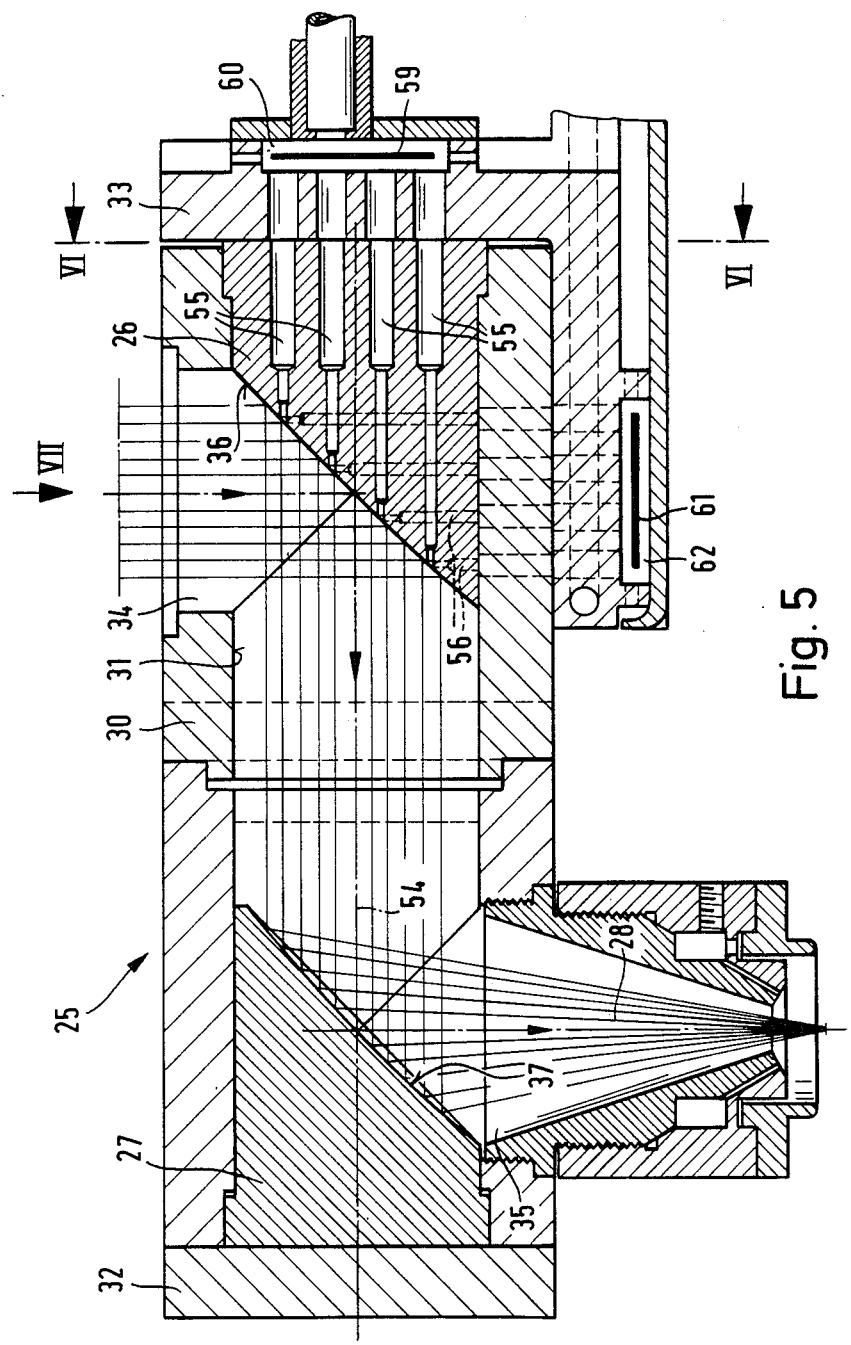
FIG. 5 shows a vertical longitudinal section through a machining optical system of a second exemplary embodiment.

As is shown in FIGS. 2 and 5, the machining optical system 25 is constructed in such a manner that the laser beam is deflected in it twice, specifically by means of a deflecting mirror 26 from a vertical into a horizontal beam direction and from the latter again by means of a focusing mirror 27 into an exit direction - at right angles thereto -of the laser beam from the machining optical system.

FIGS. 2 and 5 show furthermore that the laser beam leaves the machining optical system 25 in the form of a focused laser beam 28 in a vertical direction. Using a laser beam 28 focused in this manner, it is possible to carry out both cutting and welding machining operations and also surface finishing machining operations on a workpiece 29 (FIG. 1).

Finally, FIGS. 2 and 5 also show the construction of the machining optical system 25. According to these figures, this optical system has an elongate, horizontally disposed housing 30 with a square cross-section. A longitudinally directed, circular throughbore 31 is disposed centrally in the housing 30. The mutually opposite end faces of the housing 30 are closed by respective covers 32 and 33 constructed in the manner of flanges.

The housing 30 exhibits at least two openings in its walls, these being specifically an upper entrance opening 34 for the laser beam coming from the beam-deflecting optical system 23 and an exit opening 35 for the exit of the focused laser beam 28 from the machining optical system 25.

The mirrors required for the deflection of the laser beam are also disposed in the housing 30 of the machining optical system 25. In the present exemplary embodiment, the cylindrically designed deflecting mirror 26 with a plane reflecting surface 36 inclined at 45° is associated with the entrance opening 34. The plane reflecting surface 36 deflects the laser beam entering vertically into the machining optical system 25 onto a laser beam continuing horizontally to the focusing mirror 27. The likewise cylindrical focusing mirror 27 is disposed at the side opposite the deflecting mirror 26 in the housing 30 and has a reflecting surface 37 which likewise extends at 45° but which is designed to be rotationally symmetrically concave.

The mirrors (deflecting mirror 26; focusing mirror 27) which are centrally guided in the housing 30 are secured by respective (centric) threaded screws 38 to the respectively associated covers 32 and 33.

According to the invention, respective thermal resistances 39 and 40 are associated with each mirror (deflecting mirror 26; focusing mirror 27). The thermal resistance 40 is disposed between the deflecting mirror 26 and the cover 33 associated with the latter, specifically resting on the plane, upright rear surface 41 of the deflecting mirror 26 on the one hand and the inner end surface 42, directed towards the same, of the cover 33 on the other hand. Accordingly, the deflecting mirror 40 is constructed as a circular disc with parallel, upright contact surfaces 43. By means of a recess 44, dimensioned in an appropriate manner in terms of its diameter, in the cover 33, and a sufficiently large throughbore 45 in the centre of the thermal resistance 40, it is ensured that the latter, at the envelope surfaces, does not have any contact whatsoever with the cover 33 or with the threaded screw 38. As a result of this, only the contact surfaces 43 of the thermal resistance 40 rest against the rear surface 41 of the deflecting mirror 26 and the inner end face 42 of the cover 33.

Figure 3:
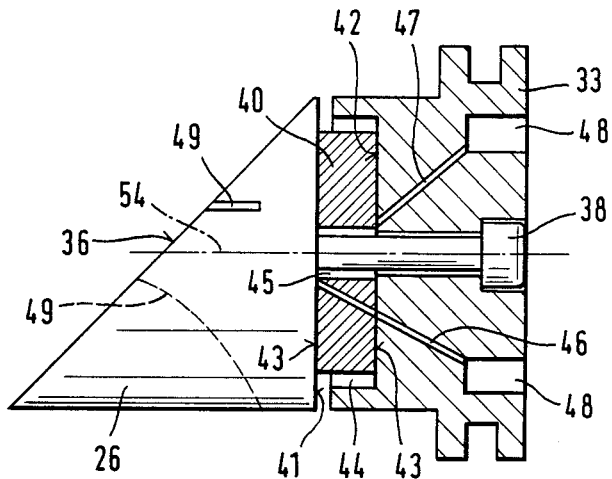
FIG. 3 shows a side elevation of a surrounding mirror with a vertically cut housing cover and a thermal resistance disposed therebetween.

Obliquely through the cover 33 and through the thermal resistance 40 there extends a narrow bore 46, which opens in the contact surface 43 of the same directed towards the deflecting mirror 26. A further obliquely directed bore 47 in the cover 33 opens in front of the (outer) contact surface 43, directed towards the same, of the thermal resistance 40. The ends of the bores 46 and 47 directed towards the outer surface of the cover 33 are provided with clearances 48. By this means, appropriate detectors (not shown in FIGS. 2 and 3) may be accommodated in the cover 33, specifically in such a manner that their sensor tips open out to abut against the rear surface 41 of the deflecting mirror 26 on the one hand and the (outer) contact surface 43 of the thermal resistance 40 on the other hand. The detectors or the sensor tips of the same are preferably constructed as thermoelectric elements known per se.

The thermal resistance 39 is constructed in a similar manner and disposed behind the focusing mirror 27; in this connection, appropriate bores 46 and 47 are provided in this case also for the association of sensor tips of appropriate detectors with the rear surface 41 of the focusing mirror 27 and with the contact surface 43 of the thermal resistance 39.

The thermal resistances 39 and 40 serve for the measurement of the beam power as well as of the degree of contamination of the focusing mirror 27. This proceeds from the finding that a significant contamination of the machining optical system 25 takes place only at the focusing mirror 27, namely on the mirror surface 37 of the same, because only the focusing mirror 27, which is situated above the workpiece 29, is exposed to negative influences in consequence of the machining of the workpiece. On the other hand, a contamination of the deflecting mirror 26, which is situated so as to be protected in the machining optical system 25, is not to be expected. Accordingly, the degree of contamination of the focusing mirror 27 is obtained from a difference measurement between the temperatures at the deflecting mirror 26 and at the focusing mirror 27. For this purpose, the two thermal resistances 39 and 40 exhibit the same cross-section, the same thickness and the same heat transit time.

The beam power is measured at the deflecting mirror 26, specifically by determination of the temperature gradient between the contact surface 43, directed towards the rear surface 41 of the deflecting mirror 26, of the thermal resistance 40 on the one hand and the opposite contact surface 43, directed towards the inner end face 42 of the cover 33, of the thermal resistance 40 on the other hand. On account of the defined dimensions of the thermal resistance 40, the temperature gradient gives a measurement value varying in proportion to the beam power, whereby, following multiplication by an appropriate transmission coefficient, the beam power impinging on the deflecting mirror 26 can be determined directly from the temperature gradient.

Figure 4:
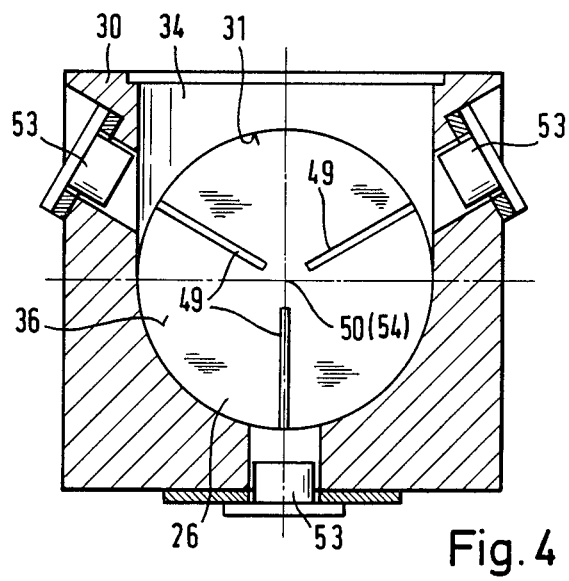
FIG. 4 shows a cross-section through the machining optical system according to FIG. 2 in the plane of three detectors associated with the deflecting mirror.

It can be seen from FIGS. 2 and 4 that radially directed slits 49 are disposed both in the deflecting mirror 26 and also in the focusing mirror 27. These interrupt the appropriate mirror surfaces 36 and 37 respectively as well as the cylindrical envelope surface of the mirrors (deflecting mirror 26; focusing mirror 27) in narrow, elongate regions. The slits 49 are symmetrically distributed in relation to mirror surfaces 36 and 37 of the mirrors (deflecting mirror 26; focusing mirror 27). In the present case, three slits 49 offset in relation to one another by 120° in each instance are provided (FIG. 4). The slits 49 proceeding from the envelope surface of the mirrors (deflecting mirror 26; focusing mirror 27) are all directed to the centre point 50 of the mirror surfaces 36 and 37 respectively, and end, without contacting one another, at a slight spacing from the same. In the event that a greater resolution of the measurement results should be required, it is feasible to provide a plurality of, in particular four - which would then be offset in relation to one another by 90°- slits 49 in the mirrors (deflecting mirror 26; focusing mirror 27). The width of the slits 49 is selected in such a manner that this is greater than the wavelength of the laser, for example 0.4 mm. By this means, it is ensured that the reduction in the effective mirror surface 36 or 37 arising in consequence of the slits 49 is insignificantly small, i.e. the effective laser power through the regions of the laser beam which are isolated in the region of the slits 49 is scarcely significant.

In relation to their depth, the slits 49 do not proceed as far as the rear surfaces 41 of the mirrors (deflecting mirror 26; focusing mirror 27). The slit floor 51 produced thereby is constructed in an arched configuration, specifically in such a manner that the regions - entering the slits 49 from the mirror surface 36 or 37 - of the laser beam directed in the longitudinal direction in relation to the axis of the mirrors (deflecting mirror 26; focusing mirror 27) are deflected radially outwards by approximately 90° at the slit floors 51 and focused. As a result of this, the focal points 52 are of the regions of the laser beam which enter the slits 49 and are deflected at the slit floors 51 are situated at a spacing from the envelope surface outside the mirrors (deflecting mirror 26, focusing mirror 27).

Furthermore, as a result of this construction of the slits 49 it is achieved that only partial regions of the laser beams incident in the longitudinal direction of the mirrors (deflecting mirror 26, focusing mirror 27) fall on the slit floors 51, and thus that transversely directed laser beams do not affect the slits 49.

As an alternative to slits 49, it is also possible for appropriate segments projects in relation to the mirror surfaces 36, 37 to be arranged to conduct the regions of the laser beam which are intended for the measurement at the mirrors (deflecting mirror 26; focusing mirror 27).

With each one of the focal points 52 there is associated a detector 53, which is mounted in the housing 30 of the machining optical system 25 at a radial spacing from the mirrors (deflecting mirror 26; focusing mirror 27). The detectors 53 are preferably constructed as thermopiles of commercially conventional construction, which permit an optimal conversion of the infrared signals incident on the slits 49.

By means of the above-described (detection) slits 49 in the mirrors (deflecting mirror 26, focusing mirror 27) and the detectors 53, it is possible to determine the diameter of the laser beam and its position in relation to the optical axis 54 (central longitudinal axis of the mirrors) of the machining optical system 25. In order to carry out the first-mentioned measurement task, an addition of the measurement signals of the detectors 23 associated with the focusing mirror 27 takes place, i.e. an evaluation of the laser beams entering through the slits 49 in the focusing mirror 27. Since from the initially described measurement of the total beam power it is possible to determine the power flux density of the laser beam - which is constant in relation to the cross-section of the laser beam - the beam diameter can be determined from this value, by taking into consideration the dimensions of the slits 49, the number thereof and the measurement results at the detectors 53, in the case of a circular laser beam.

The slits 49 or detectors 53 associated with the focusing mirror 27 also serve for the second measurement task, namely the determination of the position of the laser beam relative to the optical axis 54. However, in this case, the evaluation does not take place by a summation of the measurement results at the individual detectors 53; instead of this, the relative position of the laser beam is determined by difference measurements of the power incident in the (infrared) detectors 53, in that the centre of the laser beam in relation to the optical axis 54 is determined. In the case of three slits 49 on the mirror surface 36 of the focusing mirror 27, the centre of the laser beam is obtained by evaluation on the basis of a polar coordinate system. On the other hand, if four slits are employed, the evaluation can take place in a Cartesian coordinate system.

Finally, by means of the (detection) slits 49 it is also possible to determine the laser radiation reflected back from the workpiece 29. The slits 49 disposed in the deflecting mirror 26 and the detectors 53 associated with the same serve for this purpose. On the basis of the measurement results obtained at the deflecting mirror 26, it is possible to draw conclusions concerning the coupling-in of the laser beam at the workpiece 29. For example, a weld seam may be detected or monitored in this manner, in that setting drives are associated with the machining optical system 25, which setting drives move the machining optical system 25 relative to the workpiece 29 as a function of the measurement result at the deflecting mirror 26, until the laser beams reflected back have reached a minimum which is an indication that an optimum of the laser radiation is absorbed by the workpiece 29, i.e. the weld seam or the like has been detected.

Figure 7:
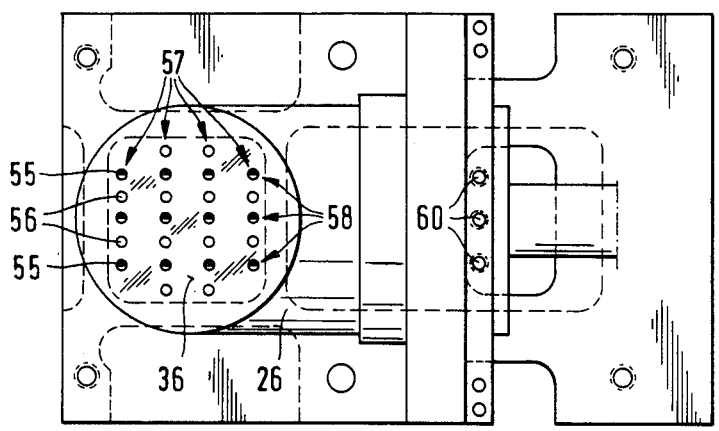
FIG. 7 shows an elevation in the direction of the arrow VII onto the mirror surface of the deflecting mirror.
Figure 6:
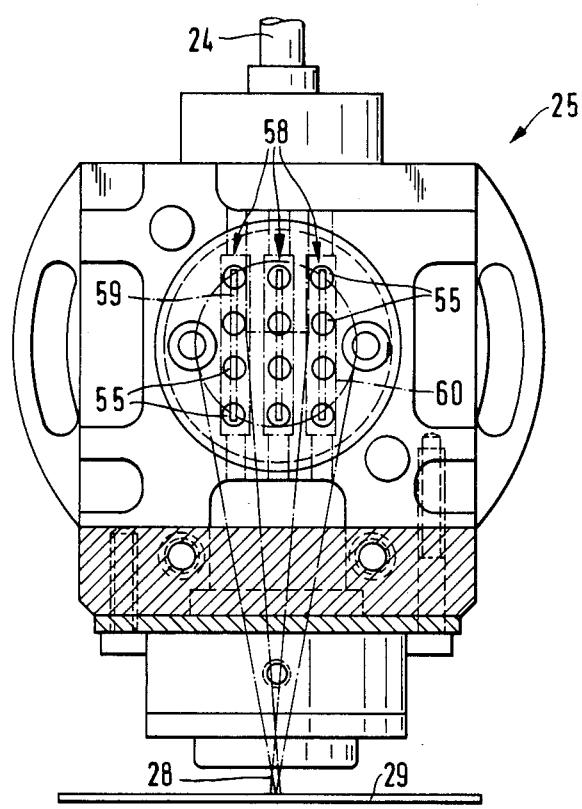
FIG. 6 shows a section VI—VI through the machining optical system according to FIG. 5.

FIGS. 5 to 7 show an alternative embodiment of a machining optical system 25, in which, in order to measure the beam position, the beam diameter and the laser beams reflected back, a multiplicity of bores distributed in the manner of a raster on the mirror surfaces 36 and 37 respectively of the mirrors are provided in place of the slits 49 which are present in the exemplary embodiment described above. In the present exemplary embodiment, the bores are disposed exclusively in the deflecting mirror 26, specifically as throughbores 55 extending parallel to the longitudinal centre line of the same and throughbores 56 extending transversely thereto. As compared with the mirror surface 37, the throughbores exhibit a very small diameter, namely approximately only 0.5 mm. The diameters of the throughbores 55 and 56 respectively increase towards the rear surface of the deflecting mirror 26 in steps.

FIG. 7 indicates the raster according to which the throughbores 55 and 26 are distributed on the mirror surface 37 of the deflecting mirror 26. According to this, a total of 24 throughbores are provided in this instance, namely 12 (horizontal) throughbores 55 and likewise 12 (vertical) throughbores 56. These are distributed in four horizontal rows 57 and seven vertical rows 58; the rows 57 and 58 which are outermost in each instance have a number of throughbores 55 and 56 respectively which is reduced by two. In FIG. 7, it is indicated by partial blackening of the throughbores 55 and 56 respectively whether these are united to a vertical or horizontal range circuit. Accordingly, the unblackened throughbores 55 and 56 respectively form the horizontal range circuits, while the half-blackened throughbores 55 and 56 respectively form the vertical range circuits. It becomes evident from this that three vertical range circuits and four horizontal range circuits are provided in the present exemplary embodiment.

FIG. 5 also shows the association of detectors 59 with the throughbores 55 and 56 respectively. On this basis, the horizontal throughbores 55 are continued in regions in the cover 33, and are connected by a bore 60 directed transversely thereto. The latter serves to accommodate one or more appropriate detectors, for example resistance thermometers consisting of wire. These can extend continuously over the entire range circuit (row 58), but can alternatively also be centrally divided, so that two detectors 59 in the form of resistance thermometers are associated with each range circuit (row 58). The detectors 61 can be constructed in a similar manner, namely also as resistance thermometers, which are accommodated in bores 62, extending transversely to the vertical throughbores 56, in the housing 30 of the machining optical system 25.

The measurement of the diameter and of the position of the incident laser beam at the deflecting mirror 26 takes place with the aid of the vertical throughbores 56, while the measurement of the position, of the power - and, where appropriate, of the diameter - of the laser light reflected back by the workpiece 29 takes place with the aid of the horizontal throughbores 55. The evaluation of the measurement results obtained at the detectors 59 and 61 respectively takes place in this instance in a similar manner to that applicable in the case of the above-described exemplary embodiment with (detection) slits 49 disposed in the mirrors (deflecting mirror 26; focusing mirror 27)

Alternatively, the throughbores 55 and 56 can also be distributed on the deflecting mirror 26 and the focusing mirror 27 in the case of this embodiment of the machining optical system 55 according to the invention, so that each mirror would then only have either vertical or horizontal throughbores.

FIGS. 8 to 11 show an exemplary embodiment of the machining optical system 25 according to the invention, in which absorbing sensors 63 are disposed directly on the mirror surface 37 of the deflecting mirror 26. In the embodiment shown in FIGS. 8 to 10, the sensors 63 can be constructed as filamentary resistance thermometers. The course of the sensors 63 disposed on the mirror surface 37 of the deflecting mirror 26 in this instance can be seen from FIG. 9. According to this arrangement, four sensors 63 constructed from wire wound in a U-shape are disposed to extend radially, distributed uniformly on the mirror surface 37, without meeting at the centre point 50 of the mirror surface 37.

FIG. 10 shows the fitting of the sensors 63 on the mirror surface 37 of the deflecting mirror 26. For this purpose, approximately semicircular recesses 64 for the sensors 63 are disposed on the mirror surface 37, which are for the greater part filled with an insulator 65, in that in each instance a wire for the sensor 63 is embedded in such a manner that the mirror surface 37 remains plane, in spite of the sensors 63 disposed thereon. The insulator 65 preferably consists of an adhesive for the permanent fixing of the wire for the sensors 63 in the recesses 64 of the deflecting mirror 26.

An alternative embodiment of the fitting of the sensors 63 on the mirror surface 37 of the deflecting mirror 26 is shown in FIG. 11. In this case, the sensors 63 - which may likewise have the progression shown in FIG. 9 - are disposed so as to be elevated on the mirror surface 37. To this end, the sensors 63 are formed from a thin, laminated conductor, which is connected to the mirror surface 37 by an insulating layer 66. Such sensors 63 can be produced, for example, by vapour deposition on the mirror surface 37 of the deflecting mirror 26.

We claim:

1. Process for the supervision of a machining process using a high-power energy laser source, in which a laser beam serving for material machining of a workpiece is passed through a machining optical system having a deflecting mirror and a focusing mirror, said process being characterized in that, during the machining of the material, governing beam parameters, relating to the beam guidance and beam geometry, are measured at the machining optical system (25), said parameters comprising the power, the position and the diameter of the laser beam, the laser radiation reflected back from the workpiece, and the degree of contamination of the mirrors.

2. Process for the supervision of a machining process using a high-power energy laser source, in which a laser beam serving for material machining of a workpiece is passed through a machining optical system having a deflecting mirror and a focusing mirror, said process being characterized in that, during the machining of the material, governing beam paramemters, relating to the beam guidance and beam geometry, are measured at the machining optical system (25); and in that the degree of contamination of the machining optical system (25), in particular of the focusing mirror (27), is measured by means of a difference measurement of the temperatures between the deflecting mirror (26) and the focusing mirror (27).

3. Process for the supervision of a machining process using a high-power energy laser source, in which a laser beam serving for material machining of a workpiece is passed through a machining optical system having a deflecting mirror and a focusing mirror, said process being characterized in that, during the machining of the material, governing beam parameters, relating to the beam guidance and beam geometry, are measured at the machining optical system (25), said parameters comprising the power, the position and the diameter of the laser beam, the laser radiation reflected back from the workpiece, and the degree of contamination of the mirrors; and in that the degree of contamination of the machining optical system (25), in particular of the focusing mirror (27), is measured by means of a difference measurement of the temperatures between the deflecting mirror (26) and the focusing mirror (27).

4. Process for the supervision of a machining process using a high-power energy laser source, in which a laser beam serving for material machining of a workpiece is passed through a machining optical system having a deflecting mirror and a focusing mirror, said process being characterized in that, during the machining of the material, governing beam parameters, relating to the beam guidance and beam geometry, are measured at the machining optical system (25); and in that selected partial regions of the laser beam are conducted to appropriate detectors (52, 59, 61) in order to measure the diameter and the position of the laser beam.

5. Process for the supervision of a machining process using a high-power energy laser source, in which a laser beam serving for material machining of a workpiece is passed through a machining optical system having a deflecting mirror and a focusing mirror, said process being characterized in that, during the machining of the material, governing beam parameters, relating to the beam guidance and beam geometry, are measured at the machining optical system (25), said parameters comprising the power, the position and the diameter of the laser beam, the laser radiation reflected back from the workpiece, and the degree of contamination of the mirrors; and in that selected partial region of the laser beam are conducted to appropriate detectors (52, 59, 61) in order to measure the diameter and the position of the laser beam.

6. Process according to claim 1, characterized in that the power, the position, the diameter, the (laser) radiation reflected back and the degree of contamination are measured cumulatively.

7. Process according to claim 1, characterized in that the temperature gradient of at least one mirror is determined in order to determine the power of the laser beam.

8. Process according to claim 7, characterized in that the temperture gradient in relation to the mirrors is measured along a defined measurement path with a defined cross-section.

9. Process according to claim 4 or 5, characterized in that, for the measurement, partial regions of the laser beam incident on a reflecting surface (36, 37) of the mirrors are isolated and are reflected onto the detectors (53, 59, 61).

10. Process according to claim 9, characterized in that the powers of the regions of the laser beam which are incident on corresponding reflecting surface partial regions selected for the measurement, are converted into evaluatable measurement signals by the detectors (53, 59, 61).

11. Process according to claim 10, characterized in that the diameter of the laser beam is determined from the summation of the laser powers measured at the detectors (53, 59, 61).

12. Process according to claim 10, characterized in that from the difference formation between the laser powers measured in a line on opposite sides of a central reference point (50) of a mirror at the detectors (53, 59, 61) the position of the laser beam relative to the reference point (50) is determined.

13. Machining optical system for the supervision of the machining process of a high-power energy source, in particular a laser, having a deflecting mirror and a focusing mirror for a (laser) beam, which are adjustably disposed in a common housing, characterized in that measurement value receivers (slits 49; throughbores 55, 56; sensors 63) for the relevant parameters of the (laser) beam which are required for the supervision are associated with the deflecting mirror (26) and the focusing mirror (27).

14. Machining optical system according to claim 13, characterized in that the measurement value receivers (slits 49, throughbores 55, 56) are constructed as an element for the transmission of selected partial regions of the (laser) beam to measurement value transducers (detectors 53, 59, 61).

15. Machining optical system according to claim 13 or 14, characterized in that a thermal resistance (39, 40) is associated with the deflecting mirror (26) and the focusing mirror (27), in order to measure the power of the (laser) beam.

16. Machining optical system according to claim 15, characterized in that the thermal resistance (39, 40) is disposed between a rear surface (41) of the mirrors (deflecting mirror 26; focusing mirror 27) and a cooling arrangement (cover 32, 33) disposed therebehind.

17. Machining optical system according to claim 16, characterized in that the surfaces of the thermal resistances (39, 40) which are not in contact with the rear surface (41) of the mirrors (deflecting mirror 26; focusing mirror 27) and the cooling arrangement (cover 32, 33) are brought, by means of appropriate clearances, out of contact with adjacent surfaces.

18. Machining optical system of claim 15, characterized in that at a contact surface (43) of the respective thermal resistance (39, 40), which contact surface is directed to the focusing mirror (27) or deflecting mirror (26), sensor tips of appropriate detectors are disposed, in order to measure the temperature gradient in the thermal resistances (39, 40).

19. Machining optical system according to claim 13, characterized in that the mirrors (deflecting mirror 26; focusing mirror 27) exhibit, in selected regions of their mirror surfaces (36, 37), openings (slits 49, throughbores 55, 56) to cause appropriate measurement value transducers (detectors 53, 59, 61) to be acted upon by (measurement) regions of the (laser) beam which cover the openings.

20. Machining optical system according to claim 19, characterized in that the openings are constructed as slits (49) in the mirrors (deflecting mirror 26; focusing mirror 27).

21. Machining optical system according to claim 20, characterized in that the bottom of the slits (49) is constructed in such a manner (in a circular-arc shape) that partial regions of the (laser) beam incident in the longitudinal direction of the mirror (deflecting mirror 26; focusing mirror 27) are focused by the bottom of each slit (49) and are reflected radially outwards offset by 90°.

22. Machining optical system according to claim 20 or 21 characterized in that at least three slits (49) which are directed radially and which are disposed so as to be uniformly distributed on the mirror surface (36, 37) are associated with each mirror (deflecting mirror 26, focusing mirror 27).

23. Machining optical system according to claim 20 or 21, characterized in that the slits (49) extend, proceeding from the (outer) envelope surface of the mirrors (deflecting mirror 26, focusing mirror 27), to a short distance in front of the centre point (50) of the same, without meeting.

24. Machining optical system according to claim 21, characterized in that a detector (53) disposed in the housing (30) is associated with each slit (49), which detector is disposed in the region of the focal point (52) of the partial region of the (laser) beam reflected by the respective slit (49).

25. Machining optical system according to claim 19, characterized in that the openings in the mirrors (deflecting mirror 26, focusing mirror 27) are constructed as bores (throughbores 55, 56).

26. Machining optical system according to claim 25, characterized in that the bores (throughbores 55, 56) in the mirrors (deflecting mirror 26, focusing mirror 27) are disposed so as to be distributed in the manner of a raster on the mirror surface (36, 27).

27. Machining optical system according to claim 25 or 26, characterized in that the bores are constructed as throughbores (55, 56) extending in the longitudinal direction of the mirrors (deflecting mirror 26, focusing mirror 27) and transversely to that direction.

28. Machining optical system according to claim 27, characterized in that a common detector (59, 61) is associated with a plurality of throughbores (55, 56) situated in one half of the mirror surfaces (36, 37) of the mirrors (deflecting mirror 26, focusing mirror 27) on a radial line.

29. Machining optical system according to claim 13, characterized in that sensors (63) serving as measurement value receivers are disposed on the mirror surface (36, 37) of the mirrors (deflecting mirror 26; focusing mirror 27).

30. Machining optical system according to claim 29, characterized in that a plurality, preferably four, sensors (63) consisting of, in particular, wire loops wound in a Ushape, are disposed so as to be uniformly radially distributed on the mirror surface (36, 37) of the mirrors (deflecting mirror 26, focusing mirror 27).

31. Machining optical system according to claim 29 or 30, characterized in that the sensors (63) are cemented onto the mirror surface (35, 37) so as to be elevated or flush.

32. Machining optical system according to claim 31, characterized in that an insulating layer is disposed between the conductors (wire, metal layer) of the sensors (63) and the mirror surface (36, 37), which insulating layer preferably consists of an adhesive which serves at the same time to secure the conductors.

* * * * *